United States Patent
Modi et al.

(10) Patent No.: US 11,615,040 B2
(45) Date of Patent: Mar. 28, 2023

(54) STRUCTURES AND METHODS FOR ADJUSTING A REFERENCE CLOCK BASED ON DATA TRANSMISSION RATE BETWEEN PHY AND MAC LAYERS

(71) Applicant: Texas Instruments Incorporated, Dallas, TX (US)

(72) Inventors: Geet Govind Modi, Cupertino, CA (US); Sumantra Seth, Bangalore (IN); Subhashish Mukherjee, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/390,428

(22) Filed: Jul. 30, 2021

(65) Prior Publication Data

US 2023/0035848 A1 Feb. 2, 2023

(51) Int. Cl.
*G06F 13/20* (2006.01)
*G06F 1/08* (2006.01)

(52) U.S. Cl.
CPC ............... *G06F 13/20* (2013.01); *G06F 1/08* (2013.01)

(58) Field of Classification Search
CPC ........ G06F 13/20; G06F 13/3625; G06F 1/08; G06F 1/10; G06F 1/105; G06F 1/12; G06F 1/14
See application file for complete search history.

(56) References Cited

U.S. PATENT DOCUMENTS

| 7,257,079 | B1 * | 8/2007 | Bachrach | H04L 12/40032 370/230 |
| 8,069,293 | B1 * | 11/2011 | Rogan | G06F 13/385 370/254 |
| 2007/0133562 | A1 * | 6/2007 | Ghiasi | H04L 49/357 370/395.42 |
| 2010/0325677 | A1 * | 12/2010 | Yu | H04L 12/413 725/109 |
| 2020/0106639 | A1 * | 4/2020 | Pannell | H04L 12/40136 |
| 2021/0185129 | A1 * | 6/2021 | Itoda | H04J 3/06 |

* cited by examiner

*Primary Examiner* — Raymond N Phan
(74) *Attorney, Agent, or Firm* — Valerie M. Davis; Frank D. Cimino

(57) ABSTRACT

A system for data transmission includes a physical (PHY) layer which has a rate detection module which determines an adopted clock rate. The rate detection module provides a rate detection signal indicative of the adopted clock rate. The PHY layer includes a reference clock generator which has an input coupled to receive the rate detection signal and an output to provide a reference clock output. The PHY layer includes a PHY interface which has a first input coupled to receive the reference clock output, a data input and a data output. The PHY interface receives data from a MAC interface at the data input and transmits data to the MAC interface through the data output responsive to the reference clock output.

21 Claims, 2 Drawing Sheets

STRUCTURES AND METHODS FOR ADJUSTING A REFERENCE CLOCK BASED ON DATA TRANSMISSION RATE BETWEEN PHY AND MAC LAYERS

TECHNICAL FIELD

This description relates generally to data transmission between PHY layers and MAC layers.

BACKGROUND

A physical layer (PHY) and/or a media access controller (MAC) are often used during wired (such as ethernet) or wireless data transmissions. The PHY acts as an interface between the transmission medium (such as an ethernet cable) and the data processor circuitry (which may include a MAC that may, for example, act as an interface between the processor and the PHY).

Data transmission/reception (by a PHY, for example) and data processing (by a MAC, for example) are, generally, performed at the edge of a reference clock signal. Typically, a main system clock generates the reference clock signal which is applied to the PHY layer and the MAC layer. The PHY layer and the MAC layer toggle data at the edge of the clock. In some applications, the required rate of transmission is lower than the reference clock frequency provided by the main system clock. For example, the system clock may generate a 100 MHz reference clock signal but the required rate of data transmission may be only 20 Mb/s. In such as scenario, a clock scaling circuit is required to allow toggling at every fifth clock edge for 20 Mb/s transmission rate. However, transmitting data at a lower rate than the reference clock signal reduces efficiency due to switching losses. Also, a very high frequency reference clock increases emission of undesired harmonics.

SUMMARY

In one aspect, a system for data transmission includes a physical (PHY) layer which has a rate detection circuit which determines an adopted clock rate. The rate detection circuit provides a rate detection signal indicative of the adopted clock rate. The PHY layer includes a reference clock generator which has an input coupled to the rate detection circuit to receive the rate detection signal and an output to provide a reference clock output responsive to the rate detection signal. The PHY layer includes a PHY interface which has a first input coupled to receive the reference clock output, a data input and a data output. The system includes a media access control (MAC) layer which has a MAC interface. The MAC interface has a first input coupled to receive the reference clock output, a data input coupled to the data output of the PHY interface, and a data output coupled to the data input of the PHY interface. The PHY interface receives data at the data input and transmits data through the data output responsive to the reference clock output. The MAC interface receives data at the data input and transmits data through the data output responsive to the reference clock output.

In an additional aspect, the frequency of the reference clock output is equal to the frequency of the adopted clock rate. The adopted clock rate is determined based on a rate negotiation protocol.

In an additional aspect, the PHY interface is a reduced media independent interface (RMII), and the MAC interface is a reduced media independent interface (RMII).

In an additional aspect, the PHY and MAC interfaces are parallel bus interfaces.

In an additional aspect, the PHY interface transfers data responsive to a rising edge or a falling edge of the reference clock output.

In an additional aspect, the PHY interface transfers data responsive to a rising edge and a falling edge of the reference clock output.

In an additional aspect, a PHY layer is configured to provide a variable speed reference clock for data transmission to a media access control (MAC) layer and for data reception from the MAC layer. The PHY layer includes a rate detection module which determines an adopted clock rate and in response provides a rate detection signal indicative of the adopted clock rate. The PHY layer includes a reference clock generator which has an input coupled to receive the rate detection signal and provides a reference clock output of a frequency equal to the frequency of the adopted clock rate. The PHY layer includes a reduced media independent interface (RMII) which has a first input coupled to receive the reference clock output, a data input and a data output. The RMII receives data from the MAC layer at the data input and transmits data to the MAC layer through the data output responsive to the reference clock output.

BRIEF DESCRIPTION OF THE DRAWINGS

The same reference numerals or other reference designators are used in the drawings to designate the same or similar (by function and/or structure) features.

DETAILED DESCRIPTION

Figure 1:
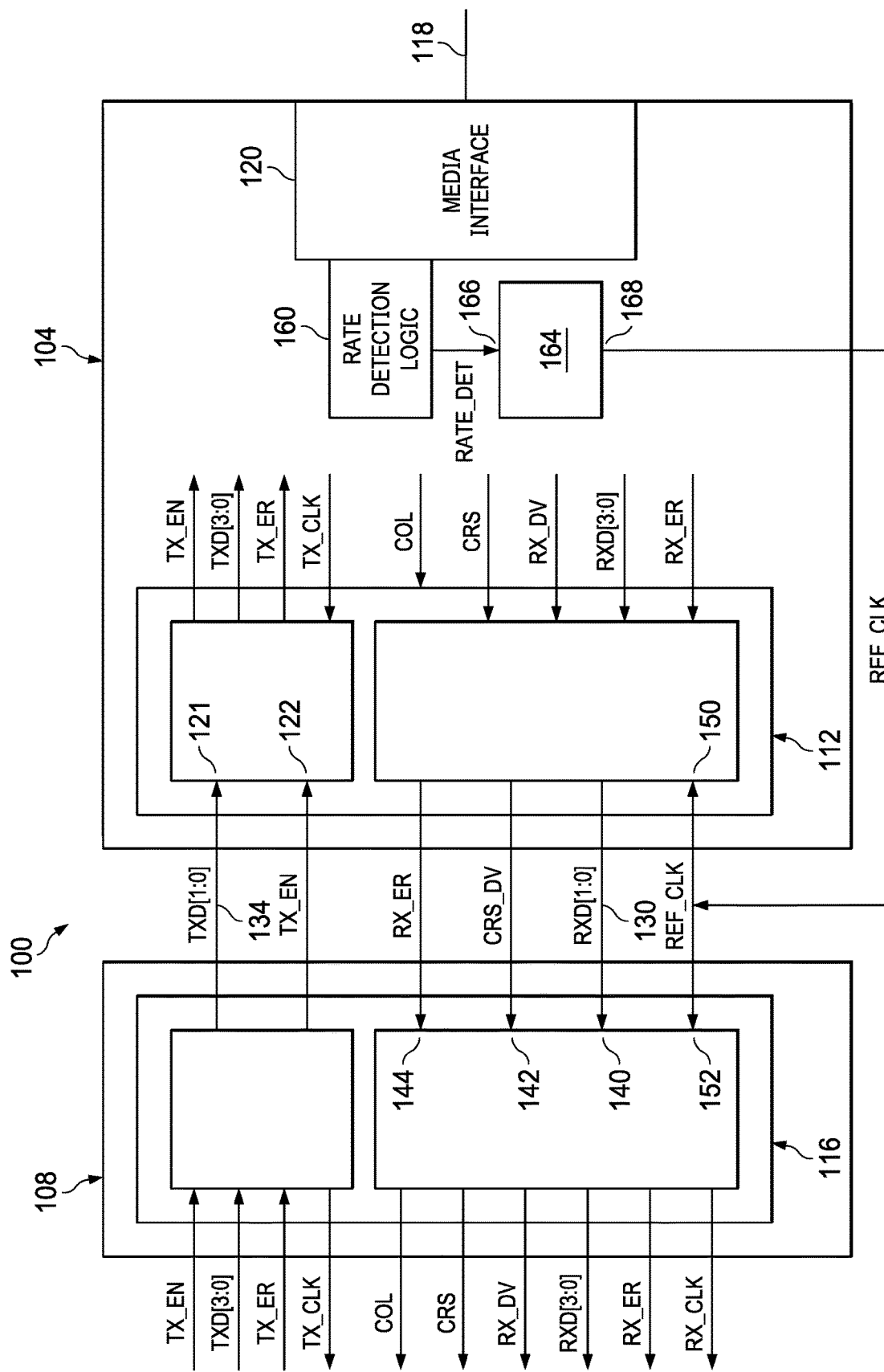
FIG. 1 is a block diagram of a system of an example embodiment.

FIG. 1 is a block diagram of a system 100 of an example embodiment. The system 100 is configured to enable variable speed data transfers between communication integrated circuits (ICs). In an example embodiment, the system 100 allows variable speed parallel data transfer between a physical (PHY) layer or medium 104 and a media access control (MAC) layer or medium 108. In some example embodiments PHY 104 and/or MAC 108 may be implemented using analog circuitry, digital circuitry (such as digital logic, processor, application specific integrated circuit, memory and/or a state machine) and/or software. In some embodiments, the MAC 108 can include a general purpose processor and/or a data processor.

The PHY layer or medium 104 is known as the layer-1 in the Open Systems Interconnection (OSI) model. The OSI is a conceptual model that standardizes communication functions of communication or computing systems irrespective of their underlying internal structure. The OSI model enables interoperability of diverse communication and computing systems with standard communication protocols. The OSI model partitions the flow of data in a system into seven abstraction layers, from the physical implementation of transmitting bits across a communication medium to the highest level representation of data (e.g., application). Each layer serves a class of functionality to the layer above it and each layer is served by the layer below it.

The PHY layer 104 includes a PHY interface 112 to facilitate two-way communication between the PHY layer 104 and the MAC layer 108. The PHY layer 104 transmits data to the MAC layer 108 via the PHY interface 112 and receives data from the MAC layer 108 via the PHY interface 112. The MAC layer 108 includes a MAC interface 116 to facilitate two-way communication between the MAC layer 108 and the PHY layer 104. The MAC layer 108 transmits data to the PHY layer 104 via the MAC interface 116 and receives data from the PHY layer 104 via the MAC interface 116.

The PHY layer 104 includes a media interface 120 to facilitate two-way communication over a physical medium 118 (e.g., copper wire, fiber optic cable, twisted pair, wireless channel). In some example embodiments, the physical medium 118 is an ethernet cable. The PHY layer 104 transmits data over the physical medium 118 via the media interface 120. The PHY layer 104 converts data received from the MAC layer 108 from a MAC layer format to another format that is suitable to be transmitted over the physical medium 118. The PHY layer 104 provides modulation and converts bits into symbols for transmission over the physical medium 118. The PHY layer 104 may add forward error correction functionality to enable error correction at a receiver (not shown in FIG. 1, but may be implemented using similar circuitry as the system 100). The PHY layer 104 converts data received over the physical medium 118 to the MAC layer format.

The MAC layer 108 is known as the layer-2 in the OSI model. The MAC layer 108 interfaces the PHY layer 104 and upper layers (i.e., network layer and above). The MAC layer 108 adds a MAC header at the start of an upper layer IP packet and adds a cyclic redundancy check (CRC) at the end of an IP packet. The MAC header includes a packet length field. The CRC enables error detection so that a receiver knows whether a received packet is erroneous or not. The MAC layer 108 also incorporates automatic retransmission request (ARQ) functionality as a means for requesting retransmission in case of errors. The retransmission request is initiated by the receiver to the transmitter.

In an example embodiment, the PHY interface 112 and the MAC interface 116 may be implemented using the reduced media independent interface (RMII) specifications established as IEEE 802.3u. The RMII connects different types of PHY layers to MAC layers. Therefore, different types of PHY devices for connecting to different media (i.e. twisted pair, fiber optic, etc.) can be used without redesigning or replacing the MAC hardware.

In an example embodiment, the PHY layer 104 provides a variable speed reference clock REF_CLK based on an adopted clock rate for data transmission between the PHY layer 104 and the MAC layer 108. The adopted clock rate is defined as the rate of transmission that may be negotiated/agreed using a rate negotiation protocol between the PHY layer 104 and the MAC layer 108. Alternatively, the adopted rate of data transmission may be fixed based on hardware capabilities or may be user defined.

For example, the adopted clock rate may be lowered from 50 Mbit/s to 10 Mbit/s. In response, the PHY layer 104 may generate a 5 MHz reference clock signal REF_CLK. Using 2 parallel data lines 130, the PHY interface 112 can transmit data (via, e.g., RXD[1:0]) to the MAC interface 116 and receive data via parallel data lines 134 (e.g., TXD[1:0]) from the MAC interface 116 at 10 Mbit/s. Alternatively, the PHY layer 104 may generate a 10 MHz REF_CLK in which case the PHY interface 112 can transmit data, using a single data line, to the MAC interface 116 and receive data from the MAC interface 116 at 10 Mbit/s. Some systems require a fixed system clock with a higher reference clock (e.g., 50 MHz). As a result, these systems require complex clock scaling circuitry to toggle data at every $5^{th}$ clock edge to enable data transmission at the adopted rate (e.g., 10 Mbit/s).

An advantage of the disclosed embodiments is that efficiency is increased because the system clock toggles at the same speed as the rate of data transmission, thus reducing switching power loss and minimizing high frequency harmonics. A further advantage of the some disclosed embodiments is that system complexity is reduced because the disclosed embodiments do not require complex clock scaling circuitry.

The PHY interface 112 and the MAC interface 116 include inputs and outputs for interconnection between the PHY layer 104 and the MAC layer 108. The functionality and arrangement of the inputs and outputs may be based on the RMMI protocol.

The PHY interface 112 includes a first data input 121 coupled to receive data from the MAC interface 116 over the data lines 134. In an example embodiment, the first data input 121 receives two bits TXD [1:0] data transmitted by the MAC interface. The PHY interface 112 includes a first enable input 122 coupled to receive an enable signal TX_EN. An assertion of TX_EN indicates that the MAC interface 116 has enabled its transmitter and thus TXD[1:0] signals will be placed on the data lines.

The MAC interface 116 includes a first data input 140 coupled to receive data from the PHY interface 104. In an example embodiment, the first data input 140 receives two bits RXD[1:0]transmitted by the PHY interface 112. The MAC interface 116 includes a second input 142 coupled to receive CRS_DV and a third input 144 coupled to receive RX_ER. The CRS_DV signal is a carrier sense/receive data valid signal and the RX_ER signal is the receive error signal. Both of these signals are specified in the RMII Specification (hereby incorporated by reference in its entirety).

The PHY interface 112 and the MAC interface 116 have respective clock inputs 150 and 152 coupled to receive a reference clock signal REF_CLK. The PHY layer 104 generates the variable speed REF_CLK based on the adopted clock rate. The adopted clock rate can be negotiated between the PHY layer 104 and the MAC layer 108 based on a rate negotiation protocol or can be user defined. The PHY interface 112 and the MAC interface transmit and receive data at a rate equal to the frequency of REF_CLK.

The PHY interface 112 includes inputs coupled to receive data from the media interface 120 and includes outputs coupled to transmit data to the media interface 120. The media interface 120 transmits data originating from the PHY interface 112 over the physical media 118, and transmits data received over the physical medium 118 to the PHY interface 112. The functionality and arrangement of the inputs and outputs for connection with the physical media 118 may be in compliance with the RMII protocol.

The MAC interface 116 includes inputs coupled to receive TX_EN, TXD, TX_ER signals (shown in FIG. 1) from the higher layer (i.e., layer above the MAC layer 112). The MAC interface 116 also includes outputs coupled to transmit TX_CLK, COL, CRS, RX_DV, RXD, RX_ER and RX_CLK signals (shown in FIG. 1) to the higher layer. The arrangement of these inputs and outputs and the signals are in compliance with the RMII protocol (hereby incorporated by reference in its entirety) and thus will not described herein.

The PHY layer 104 includes a rate detection module 160 configured to detect the adopted clock rate for data transmission between the PHY layer 104 and the MAC layer 108. As discussed before, the adopted clock rate may be negotiated between the PHY layer 104 and the MAC layer 108 based on a rate negotiation protocol, may be pre-fixed based on hardware limitations or may be user defined. The rate detection module 160 may be implemented in hardware or in software. In an example embodiment, the rate detection module 160 may be programmable by users. Responsive to the adopted clock rate, the rate detection module 160 provides a rate detection signal RATE_DET (that may, for example, have a voltage value or current value that is representative of the adopted clock rate). The rate detection voltage RATE_DET is proportional to the adopted clock rate and thus varies with the adopted clock rate.

The PHY layer 104 includes a reference clock generator 164 which has an input 166 configured to receive the rate detection voltage RATE_DET. The reference clock generator 164 provides the reference clock signal REF_CLK at an output 168 responsive to RATE_DET. The frequency of REF_CLK is equal to the frequency of the adopted clock rate.

The reference clock generator 164 may be implemented as a local oscillator which oscillates in response to an applied input voltage (e.g., a voltage controlled oscillator). If the adopted clock rate increases, the rate detect voltage RATE_DET increases which causes the local oscillator in the reference clock generator 164 to oscillate at a higher frequency. Conversely, if the adopted clock rate decreases, the rate detect voltage RATE_DET decreases which causes the local oscillator in the reference clock generator to oscillate at a lower frequency.

The reference clock signal REF_CLK is received by the PHY interface 112 at the clock input 150 and received by MAC interface 116 at the clock input 152. The PHY interface 112 transfers data to the MAC interface 116 responsive to REF_CLK, and the MAC interface 116 transfers data to the PHY interface 112 responsive to the REF_CLK.

In an example embodiment, the PHY interface 112 is configured to transfer data to the MAC interface 116 responsive to a rising edge or a falling edge of REF_CLK. In another example embodiment, the PHY interface 112 is configured to transfer data to the MAC interface 116 responsive to both rising and falling edges of REF_CLK.

In an example embodiment, the MAC interface 116 is configured to transfer data to the PHY interface 112 responsive to a rising edge or a falling edge of REF_CLK. In another example embodiment, the MAC interface 116 is configured to transfer data to the PHY interface 112 responsive to both rising and falling edges of REF_CLK.

An advantage of the system 100 is its ability to provide slower reference clock signal in response to a lower adopted clock rate without relying on complex clock scaling circuitry. A further advantage of the system 100 is that the system clock toggles at the same speed as the rate of data transmission, thereby reducing switching power loss. A further advantage of the system 100 is that a slower clock results in relaxation of rise and fall time specifications for the PHY interface 112 and the MAC interface 116. A relaxation of rise and fall time specifications reduce radio frequency (RF) emission. As an example, the PHY interface 112 and the MAC interface 116 transmits data at 10 Mbit/s. A further advantage of a slower clock is increased timing margin (e.g., setup/hold time), which allows relaxed timing requirements. In an example embodiment, the system 100 operated at 10 Mbps and exhibited 10 ns setup time and 10 ns hold time.

The rate detection module 160 refers to a functional unit which may be implemented by dedicated hardware (such as an application specific integrated circuit (ASIC), a processor and/or digital logic) and/or software.

Figure 2:
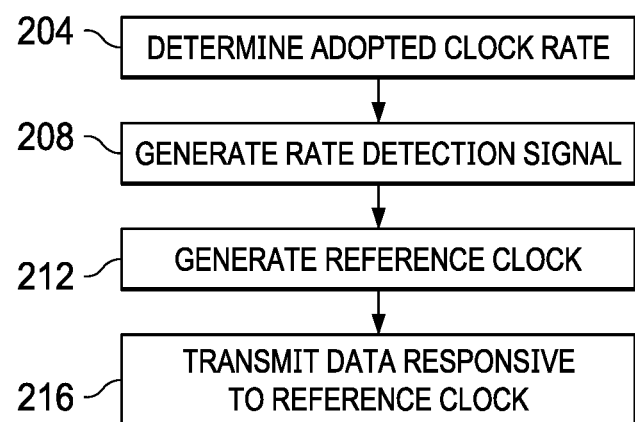
FIG. 2 is a flow diagram of a method of an example embodiment.

FIG. 2 is a flow diagram of a method of an example embodiment. In block 204, the adopted clock rate for data transmission between the PHY layer 104 and the MAC layer 108 is determined. In an example embodiment, the adopted clock rate is negotiated between the PHY layer 104 and the MAC layer 108 based on a rate negotiation protocol. In other embodiments, the adopted clock may be pre-fixed based on hardware capacity or may be user defined. In an example embodiment, the adopted clock rate is determined by a functional unit such as the rate detection module 160.

In block 208, a rate detection signal RATE_DET indicative of the adopted clock rate is generated in response to the adopted clock rate. In an example embodiment, the rate detection signal RATE_DET may be a voltage or a current proportional to, or is indicative of, the adopted clock rate. In block 212, a reference clock signal REF_CLK is generated responsive to the rate detection indication RATE_DET. In an example embodiment, REF_CLK is generated by the reference clock generator 164 which has a local oscillator configured to oscillate at a frequency responsive the rate detection voltage RATE_DET. If RATE_DET increases, the oscillator frequency increases, and if RATE_DET decreases, the oscillator frequency decreases. Thus, REF_CLK frequency varies depending on the adopted clock rate.

In block 216, the PHY interface 112 and the MAC interface 116 transmits data responsive to REF_CLK. The transmission may occur at rising or falling edges of REF_CLK or may occur at both rising and falling edges of REF_CLK.

In this description, the term "couple" may cover connections, communications, or signal paths that enable a functional relationship consistent with this description. For example, if device A provides a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal provided by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

As used herein, the terms "terminal", "node", "interconnection" and "pin" are used interchangeably. Unless specifically stated to the contrary, these terms are generally used to mean an interconnection between or a terminus of a device element, a circuit element, an integrated circuit, a device or other electronics or semiconductor component.

While certain components may be described herein as being of a particular process technology, these components may be exchanged for components of other process technologies. Circuits described herein are reconfigurable to include the replaced components to provide functionality at least partially similar to functionality available before the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor. Also, uses of the phrase "ground terminal" in this description include a chassis ground, an Earth ground, a floating ground, a virtual ground, a digital ground, a common ground, and/or any other form of ground connection applicable to, or suitable for, the teachings of this description. Unless otherwise stated, "about", "approximately", or "substantially" preceding a value means+/−10 percent of the stated value.

Modifications are possible in the described embodiments, and other embodiments are possible, within the scope of the claims.

What is claimed is:

1. A system for data transmission, comprising:
   a physical (PHY) layer and a media access control (MAC) layer;
   the PHY layer including:
      a rate detection circuit operable to determine an adopted clock rate indicative of the data transmission rate between the PHY layer and the MAC layer, and in response, provide a rate detection signal having at least one attribute indicative of the adopted clock rate;
      a reference clock generator having an input coupled to the rate detection circuit to receive the rate detection signal and a reference clock output, the reference clock generator operable to output, in response to the rate detection signal, a reference clock signal at the reference clock output; and
      a PHY interface having a data input, a data output and a first input coupled to the reference clock output; and
   the MAC layer including a MAC interface, the MAC interface having a first input coupled to the reference clock output, a data input coupled to the data output of the PHY interface, and a data output coupled to the data input of the PHY interface,
   wherein the PHY interface is operable to receive data at the data input and transmit data through the data output of the PHY interface responsive to the reference clock signal, and wherein the MAC interface is operable to receive data at the data input of the MAC interface and transmit data through the data output of the MAC interface responsive to the reference clock signal.

2. The system of claim 1, wherein the frequency of the reference clock signal is equal to the frequency of the adopted clock rate.

3. The system of claim 1, wherein the adopted clock rate is determined based on a rate negotiation protocol.

4. The system of claim 1, wherein the rate detection signal is varied responsive to the adopted clock rate.

5. The system of claim 1, wherein the frequency of the reference clock is varied responsive to the rate detection signal.

6. The system of claim 1, wherein the PHY interface is a reduced media independent interface (RMII).

7. The system of claim 1, wherein the MAC interface is a reduced media independent interface (RMII).

8. The system of claim 1, wherein the PHY and MAC interfaces are parallel bus interfaces.

9. The system of claim 1, wherein the PHY interface is operable to transfer data responsive to a rising edge of the reference clock signal.

10. The system of claim 1, wherein the PHY interface is operable to transfer data responsive to a falling edge of the reference clock signal.

11. The system of claim 1, wherein the PHY interface is operable to transfer data responsive to a rising edge and a falling edge of the reference clock signal.

12. A physical (PHY) layer configured to provide a variable rate reference clock signal for data transmission to a media access controller (MAC) layer and for data reception from the MAC layer to the PHY layer, the PHY layer comprising:
   a rate detection module operable to determine an adopted clock rate having an adopted clock rate frequency corresponding a rate of data transmission to and from the MAC layer, and provide a rate detection signal indicative of the adopted clock rate;
   a reference clock generator having an input coupled to receive the rate detection signal and a reference clock output, the reference clock generator operable to output at the reference clock output a reference clock signal having a frequency equal to the adopted clock rate frequency, the reference clock generator further operable to output the reference clock signal to the MAC layer; and
   a reduced media independent interface (RMII) having a reference clock input coupled to the reference clock output, the reference clock input configured to receive the reference clock signal, a data input and a data output,
   wherein the RMII is operable to receive data from the MAC layer at the data input and transmit data to the MAC layer through the data output responsive to the reference clock signal.

13. The PHY layer of claim 12, wherein the adopted clock rate is determined based on a rate negotiation protocol.

14. The PHY layer of claim 12, wherein the rate detection signal is varied responsive to the adopted clock rate.

15. The PHY layer of claim 12, wherein the rate of the reference clock signal is varied responsive to the rate detection signal.

16. The PHY layer of claim 12, wherein the RMII is operable to transmit and receive data responsive to a rising edge of the reference clock signal.

17. The PHY layer of claim 12, wherein the RMII is operable to transmit and receive data responsive to a falling edge of the reference clock signal.

18. The PHY layer of claim 12, wherein the RMII is operable to transmit and receive data responsive to a rising edge and a falling edge of the reference clock signal.

19. A method of generating a variable rate reference clock signal for data transmission from a physical (PHY) layer to a media access controller (MAC) layer and for data reception by the PHY layer from the MAC layer, the method comprising:
- determining an adopted clock rate corresponding to a rate of data transmission between the PHY layer and the MAC layer;
- generating, responsive to the adopted clock rate, a rate detection signal indicative of the adopted clock rate;
- generating a reference clock signal responsive to the rate detection signal;
- transmitting the reference clock signal to a reference clock input of each of the PHY layer and the MAC layer; and
- transmitting data by the PHY layer responsive to the reference clock signal and receiving data from the MAC layer responsive to the reference clock signal.

20. The method of claim 19, wherein the adopted clock rate is determined based on a rate negotiation protocol.

21. The method of claim 19 further comprising varying the rate of the reference clock signal responsive to the rate detection signal.

* * * * *